US012775731B2

(12) United States Patent
Walker

(10) Patent No.: US 12,775,731 B2
(45) Date of Patent: Oct. 27, 2026

(54) PROVENANCE DATA INTEGRITY PROTECTION

(71) Applicant: Camera Bits, Inc., Hillsboro, OR (US)

(72) Inventor: Dennis James Walker, Portland, OR (US)

(73) Assignee: Camera Bits, Inc., Hillsboro, OR (US)

( * ) Notice: Subject to any disclaimer, the term of this patent is extended or adjusted under 35 U.S.C. 154(b) by 0 days.

(21) Appl. No.: 18/825,951

(22) Filed: Sep. 5, 2024

(65) Prior Publication Data

US 2025/0086301 A1 Mar. 13, 2025

Related U.S. Application Data

(60) Provisional application No. 63/581,498, filed on Sep. 8, 2023.

(51) Int. Cl.
*G06F 21/62* (2013.01)

(52) U.S. Cl.
CPC ................................ *G06F 21/6218* (2013.01)

(58) Field of Classification Search
CPC .......... G06F 21/10; G06F 21/64; G06F 21/16; G06F 21/105; H04L 9/3247; H04L 63/12; H04L 63/123; H04L 2463/101; H04L 2463/102; H04L 2209/603; H04L 2209/60
See application file for complete search history.

(56) References Cited

U.S. PATENT DOCUMENTS 11,449,584 B1 * 9/2022 Pamucci ............... H04L 9/0897
11,770,260 B1 * 9/2023 Pamucci ............ H04N 21/8358
12,335,395 B2 * 6/2025 Jakobsson ............. H04L 9/3297
2013/0018873 A1 1/2013 Velasco
2019/0236175 A1 8/2019 Cham
2019/0236302 A1 * 8/2019 Czerkowicz .......... H04L 9/3247
2020/0110516 A1 * 4/2020 Ooba .................... G06F 16/538
2021/0409489 A1 * 12/2021 Speasl ................... H04L 63/123
(Continued)

FOREIGN PATENT DOCUMENTS

WO PCT/US2024/045622 9/2024

OTHER PUBLICATIONS

PCT/US2024/045622 Intl Search Report and Written Opinion issued Nov. 14, 2024, 14 pages.
(Continued)

*Primary Examiner* — Tae K Kim
(74) *Attorney, Agent, or Firm* — Berkeley Law & Technology Group, LLP

(57) ABSTRACT

Original metadata of a digital media file is stored in a provenance storage, such as in JPEG application markers, such that a larger or otherwise suitable number of metadata edits may be made while tracking the original metadata or the extent of the metadata changes. Once a user, program, process, or the like is ready to commit to a revised version of the original digital media file, a record of editable metadata changes made can be derived from comparing a current editable metadata to the original editable metadata stored in the provenance storage. The editable metadata changes may therefore be combined into a provenance record of metadata changes and signed, and/or written into a new digital media file and signed, such that provenance of the digital media file can be tracked back to the original digital media file.

16 Claims, 9 Drawing Sheets

SAVE AS/COMMIT AND RE-SIGN

(56) References Cited

U.S. PATENT DOCUMENTS

| | | | | |
|---|---|---|---|---|
| 2022/0391541 | A1* | 12/2022 | Novotny | G06F 21/57 |
| 2023/0011621 | A1* | 1/2023 | Jakobsson | H04L 9/3213 |
| 2023/0114684 | A1* | 4/2023 | Jakobsson | H04L 9/3213<br>713/159 |
| 2023/0403443 | A1* | 12/2023 | Doken | H04L 9/0891 |

OTHER PUBLICATIONS

PCT/US2024/045622 PCT International Preliminary Report on Patentability issued Jan. 23, 2026, 20 pages.

PCT/US2024/045622 Article 34 Amendment and Chapter II Demand filed Jul. 8, 2025, 20 pages.

* cited by examiner

SAVE AS/COMMIT AND RE-SIGN

PROVENANCE DATA INTEGRITY PROTECTION

CROSS-REFERENCE TO RELATED APPLICATIONS

This application claims priority to, and the benefit of, U.S. Provisional App. No. 63/581,498, titled "DIGITAL MEDIA ASSET AUTHENTICATION," filed on Sep. 8, 2023, the entirety of which is incorporated herein by reference.

FIELD

The field relates generally to electronic content or data protection, which may include digital media or like assets and, more specifically, to provenance data integrity protection, which may include authentication of digital media or like assets, such as metadata, for example, among others.

BACKGROUND

Digital media or like assets, such as photographs, voice recordings, videos, etc. continue to evolve and may be posed to supersede or replace their historical analog counterparts. Rapid proliferation of cameras on smart phones and other such technological advances have contributed to exponential growth in the amount of such digital media or like assets created. For example, media sharing sites, such as TikTok, YouTube, Instagram, and the like allow anyone to establish an account and become a media creator, producing content with technical quality that was only available to professionals just a decade or two ago. Everybody from news organizations and professional broadcast teams to bloggers, Instagram models, and video channel creators or influencers can see their digital media content explode in popularity if it's sufficiently engaging, encouraging millions more people to create such content every year.

This or like ability to create, modify, or fake this or like electronic content using commonly available tools is simultaneously exploding, with tools such as ChatGPT for creating generative text, Generative Fill using Adobe's Firefly AI engine in Adobe Photoshop for creating or modifying photographic content, and DALL-E for creating artificial photorealistic images from simple text prompts. Because the capabilities of such tools continue to advance at a rapid pace, it has become increasingly difficult to determine whether an image that appears to be a digital photo is an actual photograph, or whether it has been altered significantly to change its appearance or content.

Some tools use digital signatures such that a content creator (such as a digital camera) can sign a photograph, allowing subsequent users of the photograph to validate its authenticity. Tracking changes to signed or authenticated photographs may be a more complex task, often entailing storing several versions of the same image or creation of a "sidecar" file such as Adobe Photoshop's XMP file that stores details of image edits and metadata changes made to the original authentic photo. But such sidecar files can become very large, and if the sidecar file becomes separated from the original image file the changes can be lost. Further, the process of cryptographically signing an image file after making image edits and metadata changes is a computationally expensive operation and increases the size of the asset. A need therefore exists for more efficient and/or more effective management of changes to digitally signed or authenticated media assets.

Figure 1A:
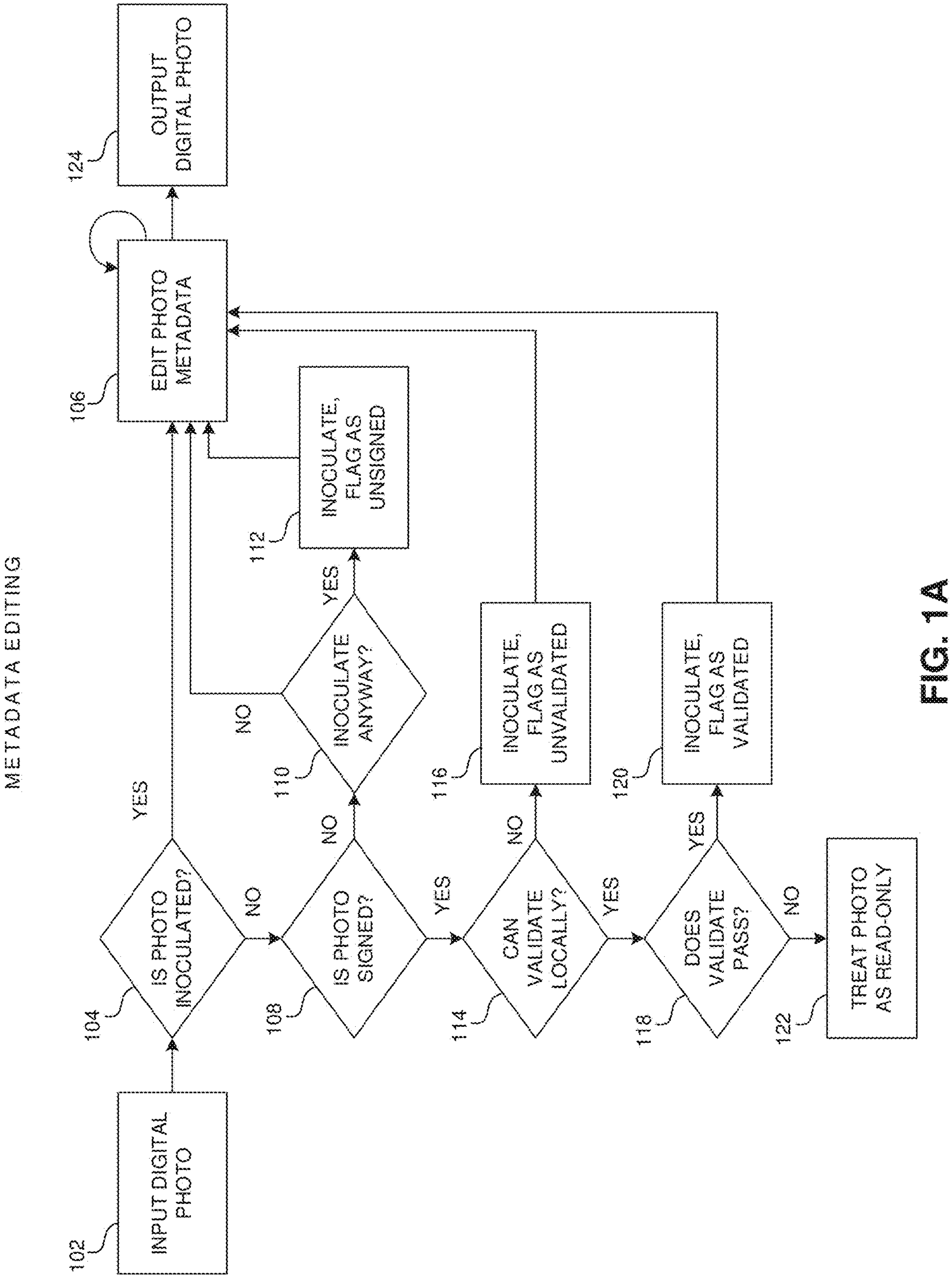
FIGS. 1A and 1B are flow diagrams of a process to repeatedly edit metadata in a digital media file before committing to or saving the changed file with a new digital signature, consistent with an example embodiment.

The drawings are provided to aid in understanding the various examples provided in the specification, and do not limit the scope of the claims or their equivalents. Not all drawings are to scale, and some parts or features may be omitted or magnified to better illustrate certain features of the examples shown.

DETAILED DESCRIPTION

In the following detailed description of example embodiments, reference is made to specific example embodiments by way of drawings and illustrations. These examples are described in sufficient detail to enable those skilled in the art to practice what is described and serve to illustrate how elements of these examples may be applied to various purposes or embodiments. Other embodiments exist, and logical, mechanical, electrical, and other changes may be made.

Features or limitations of various embodiments described herein, however important to the example embodiments in which they are incorporated, do not limit other embodiments, and any reference to the elements, operation, and application of the examples serve only to aid in understanding these example embodiments. Features or elements shown in various examples described herein can be combined in ways other than shown in the examples, and any such combinations is explicitly contemplated to be within the scope of the examples presented here. The following detailed description does not, therefore, limit the scope of what is claimed.

As alluded to previously, integrity of electronic content or data, such as in connection with protecting provenance or like records associated with digital media, such as photographs, for example, is increasingly of interest as artificial intelligence (AI) tools and sophisticated image editing software are enabling content creators to create, modify, and/or modify or even fake such digital content. As a way of illustration, tools such as DALL-E can create photorealistic photographs using artificial intelligence from a text prompt describing the desired photo content, for example, and new tools such as Generative Fill in Adobe Photoshop (using Adobe's Firefly AI engine) can fabricate missing or damaged parts of photos by inferring content from the rest of the photo. Because tools such as these continue to improve quite rapidly, it is becoming increasingly difficult to determine whether a photographic image is a real image taken by a camera that documents an actual event, has been substantially edited or modified by AI, or has been entirely fabricated or faked.

In some instances, using digital signatures to sign the content of photos and other digital media files can help ensure that a photo has not been altered since being signed, and so digital signature capabilities are being employed by many tools such as digital cameras and video recorders, among others. The device making the digital media file may, for example, sign the file upon creation using technology such as the device's private key in a public key cryptographic signature scheme, allowing others to use the device's published public key to verify that the originating device signed the digital media file. But such or like modification to the signed digital media file, including changes to metadata that do not change the content of the image or other digital media itself, may render the digital signature invalid such that it can no longer be used to validate or authenticate the digital media file.

In digital photography, it is common for photographers to capture photos and later add metadata such as adding a caption, adding the author or photographer's name, adding time, date, and location information, and the like. Some tools such as Camera Bits, Inc's Photo Mechanic tool have been developed to help photographers manage photos by inserting such metadata, organizing photos by metadata, automating metadata management tasks for photographers, etc. But each time metadata is changed in the digital image file, the previous digital signature becomes invalid, and the modified file may be re-signed to maintain provenance. Even if a digital media file's digital signature is validated before a change and the file is digitally re-signed after the change, tracking the nature of multiple changes made to the digital file and the authenticity or reliability of each digital signer of the digital media file may become a daunting task. Similarly, re-signing a self-signed or unsigned digital media file for each change may be computationally expensive but desirable in some applications, such as where a camera does not produce a signed media file or where a digital media file is signed with a user-supplied certificate.

To avoid or reduce the computational expense and/or added storage requirements every time a small change is made to a digital file that is to be digitally signed, the changes could be saved in some other temporary storage mechanism to avoid invalidating the digital signature of the original file where the original file is signed. For example, a "sidecar" file could be maintained alongside the original digitally signed file, similar in concept to XMP sidecar files used by tools such as Adobe Photoshop for formats like RAW files that cannot safely be modified with metadata edits. In another example, a system-wide database could be maintained to track changes made to multiple photos before they are digitally re-signed with the accumulated changes. Both of these methods are inherently non-standard and may be unreliable in a dynamic environment where photos are moved between different computers. Further, sidecar files or database records may grow very large if many rounds of changes are made or if changes are made to the photo itself, and loss of the sidecar files or database records means that all these changes to the original digitally signed digital image are lost. Thus, in some instances, tools such as Photo Mechanic that may primarily store edits to metadata of digital image files may face burdensome digital signature requirements, such as if a larger number of changes are made to the metadata, as each or suitable new change stored to the digital image file may involve a new computationally expensive digital signature be saved along with each or suitable change.

Some examples presented herein therefore may advantageously address these or like challenges such as these by using techniques such as storing one or more metadata elements of a validated signed digital media file in a provenance storage within the digital media file, and subsequently allowing repeated edits to the one or more metadata elements without digitally re-signing the digital media file. If a user is ready to commit to the metadata changes or to save the file as a digitally signed digital media file, the original metadata from the provenance storage is compared to the current metadata and one or more change records are created (and in a further example digitally signed) representing these metadata changes. The changed digital media file is then digitally signed, and in a further example comprises enough information through its one or more change records and accumulated digital signatures to recreate and validate the original digitally signed digital media file.

In a particular implementation, a digital media file in a more detailed example may comprise a JPEG (Joint Photographic Experts Group) digital image file, and the metadata may comprise metadata fields such as author, copyright, description, time, date, location, title, subject, and rating. The provenance storage may be embedded in one or more application marker records, which in a further example may be compressed. It should be appreciated that subject matter is not limited to a particular digital media file, format, metadata, etc. and that one or more other digital media files, formats, metadata, etc. may be utilized herein, at least in part, such as in a similar manner and without deviating from the scope and spirit of subject matter.

Figure 1B:
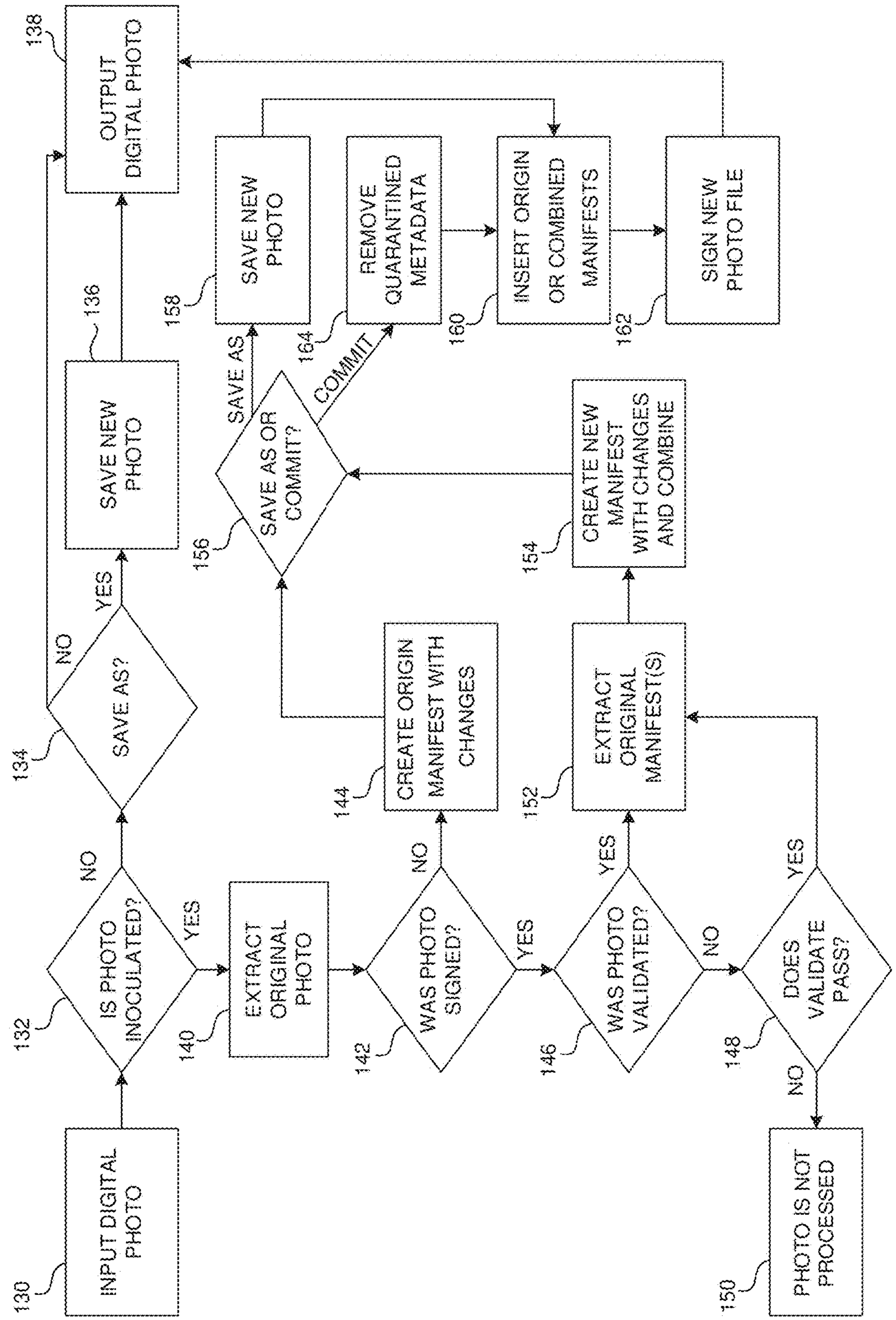

FIGS. 1A and 1B are flow diagrams of a process to edit metadata (e.g., repeatedly, etc.) in a digital media file before committing to or saving the changed file with a new digital signature, consistent with an example embodiment. The process shown in FIGS. 1A and 1B comprises two different phases-a metadata editing process shown generally in FIG. 1A, and a save as/commit and re-sign process shown generally in FIG. 1B.

An existing digital media file such as a digital photo may be loaded at 102 to start the metadata editing process. The process may determine whether the digital photo is already inoculated at 104, such that if the photo has already been inoculated the photo metadata can be freely edited at 106. If the photo is not already inoculated at 104, the process may determine whether the digital photo is digitally signed at 108, such as having been signed with a public key cryptographic signature. If the photo is not digitally signed, the process may optionally decide to inoculate the photo anyway at 110, such as based on an "always inoculate" preference setting or user selection in the digital media editing software. If the decision is made not to inoculate at 110, the metadata associated with the photo may be freely edited at 106. If the decision is made to inoculate at 110, or if the photo has been digitally signed as determined at 108, an attempt to preserve the provenance of the signed photo may be made, as shown at 112 and 114-122.

To preserve the provenance of the signed photo, the process determines at 114 whether the digital signature for the photo can be validated locally (e.g., not relying upon a remote server or service to validate the signature). If the digital signature cannot be validated locally, the digital signature and metadata may be stored in a provenance storage in a process here referenced as "inoculation" at 116, such that the original state of the digitally signed photo's metadata is preserved. The unvalidated but digitally signed photo may also be flagged as unvalidated at 116. If the digital signature can be validated locally as determined at 114, a validation attempt may be performed at 118, such that if validation passes the digital photo file is inoculated and flagged as validated at 120. If the digital signature validation does not pass at 118, the photo is treated as read-only at 122, and no edits may be made.

If the photo's digital media file is inoculated at 112, 116, or 120, metadata associated with the photo and stored in the digital media file (such as a JPEG file) may be edited at 106. In some examples, the edits may be performed in several steps or through several rounds of editing, organizing, tagging, or otherwise processing the file. Examples of metadata that may be edited for a digital JPEG file include metadata such as author, copyright, description, keywords, time, date, location, title, subject, and rating. JPEG files support many other standard metadata fields and provide provisions for custom metadata fields, and any of these may be similarly edited at 106.

Once metadata edits are complete, such as may be determined by a user, by software such as Camera Bits, Inc's Photo Mechanic software, or by another such process, the process of saving and/or committing the edits into a newly-written and newly-signed file as shown in FIG. 1B may be undertaken. The edited photo is received as an input digital photo at 130, and at 132 the process determines whether the photo contains an inoculation record, such as may have been generated at 112, 116, or 120 of FIG. 1A. The inoculation record in this example may comprise stored metadata and/or other information such as digital signature, validation status, file size, cryptographic checksum and/or hash, and other such information, and may be stored in a provenance storage such as within one or more application markers of a JPEG file. If the digital photo has not been inoculated as determined at 132, it may be decided at 134 to save as a new photo file using normal "save as" functionality at 136, and delivered such as to a user, a storage, a photo bureau or service, or the like as output digital photo at 138.

If the photo is determined to be inoculated at 132 (i.e., to have provenance records such as metadata of the original digitally signed file stored), the original photo may be extracted at 140. If it is determined at 142 that the digital photo prior to inoculation was not digitally signed but inoculated anyway such as at 112 of FIG. 1A, an origin manifest is created at 144 that includes one or more assertions about changes made to the metadata, and the manifest is digitally signed. In this context, an "origin" manifest refers to the first manifest in a provenance chain of manifests, which in some instances may be done in camera. It should be appreciated that subject matter should not be limited to "signed in-camera" or "already-signed" photos. For example, a person skilled in the art would appreciate that an "origin" manifest (e.g., containing "c2pa.created action" assertion and/or IPTC statement that this is a digital capture, etc.) may be created, but this manifest may also include changes that were made since inoculation. So, it is not a typical or "normal" origin manifest in the sense that assertions about what changed from the "original" photo may be included therein. For example, two manifests may be internally created, such as a simple "origin" manifest (e.g., using the state of the original photo that was inoculated, etc.) and then sign it a second time with another manifest denoting the changes.

More specifically, if a non-typical or non-standard (e.g., proprietary, etc.) digital signing technology is involved, a proprietary digital signature may be converted into a more standard digital signature, such as C2PA, for example, or other applicable technology according to a particular (e.g., proprietary, etc.) "recipe" or approach (e.g., which may preserve the ability to do authenticity checks on a third-party server beyond cryptographic signatures, etc.). In such a case, a workflow may be implemented, in whole or in part, in a similar manner, wherein a photo with a proprietary digital signature may be inoculated, then if a user wants to "commit" and "re-sign", an applicable digital file (e.g., JPEG with a proprietary digital signature, etc.) may be extracted so as to convert that file to C2PA (thus, creating an "origin" manifest), then apply metadata changes to that C2PA photo, then sign this a second time with a manifest of the changes. In some instances, a more efficient workflow for a proprietary digital signature system may include inoculation on the ingest (e.g., copying from a camera, etc.) and delay for a suitable period of time the conversion from a proprietary digital signature to a more standard (C2PA) digital signature. However, in order for photos with a proprietary digital signature to avoid or otherwise minimize utilization of "inoculation" of their proprietary format, a process may implement this (C2PA) conversion in a suitable manner, such as up front for every suitable photo (e.g., as first step), for example, and therefore a proprietary photo may just become another more standard (C2PA) photo. At times, this "convert to C2PA or other more standard digital signature first" approach may be relatively slow and may bloat up applicable single or other files (e.g., if users typically use a smaller percentage of captured photos). To address these or like issues, for efficiency, in some instances, it may be beneficial to inoculate photos with a proprietary digital signature prior to such (C2PA) conversion. Note that a more standard, such as a C2PA-compliant camera (e.g., from a third party, like Nikon or Canon, etc.) may have already done the computational C2PA signing work and the associated file size bloating. Here, by delaying C2PA conversion, inoculating photos with a proprietary digital signature may have an advantage in terms of overall speed of processing and reduced file sizes, for example.

Continuing with the example process, the process may determine if the photo was validated via a digital signature prior to inoculation at 146. If the photo was not validated prior to inoculation as determined at 146, a validation check may be performed at 148 such that if the validation does not pass the photo is not processed at 150 and if the validation does pass, the original digitally signed manifest(s) may be extracted from the inoculation record or stored provenance at 152. If the photo was validated prior to inoculation as determined at 146, the original digitally signed manifest(s) are similarly extracted at 152.

A new manifest that includes one or more assertions about changes made to the metadata may be created and digitally signed, then combined with the original digitally signed manifest(s) at 154. The new metadata and/or other such changes reflected in the new manifest may be stored with the digital image file by either a "commit" process in which the changed metadata is committed to the original file, or as a "save as" file in which the file is saved as a new photo image file. If "save as" storage is selected at 156, the photo is saved as a new photo file at 158, and the origin manifest from 144 or combined manifests from 154 are saved with the new file at 160. The new file with the inserted manifests may then be digitally signed at 162 such as using a public key cryptographic digital signature or other suitable digital signature, and delivered as output digital photo at 138. If "commit" is selected as a storage method at 156, quarantined metadata (such as the inoculation record) is removed from the inoculated digital image file at 164, and the origin manifest from 144 or combined manifests from block 154 are inserted into the file at 160. The digital photo may then be signed at 162, and delivered as output digital photo at 138.

The example of FIGS. 1A and 1B shows how an inoculation record (or provenance storage record) can be used, in whole or in part, to maintain a record of a digital media file's original metadata and/or related information, allowing such information to be more freely and repeatedly edited without one or more updates to a digital signature of the file. Once such edits are complete, the scope of edits may be determined by comparing the file's current state with the metadata and/or related information stored in the inoculation record, and creating a change record or manifest reflecting such changes. The manifest may then be stored with an updated or new digital media file that is then digitally signed, preserving provenance of the original digital media file's content as well as reflecting the provenance of the edits.

Figure 2A:
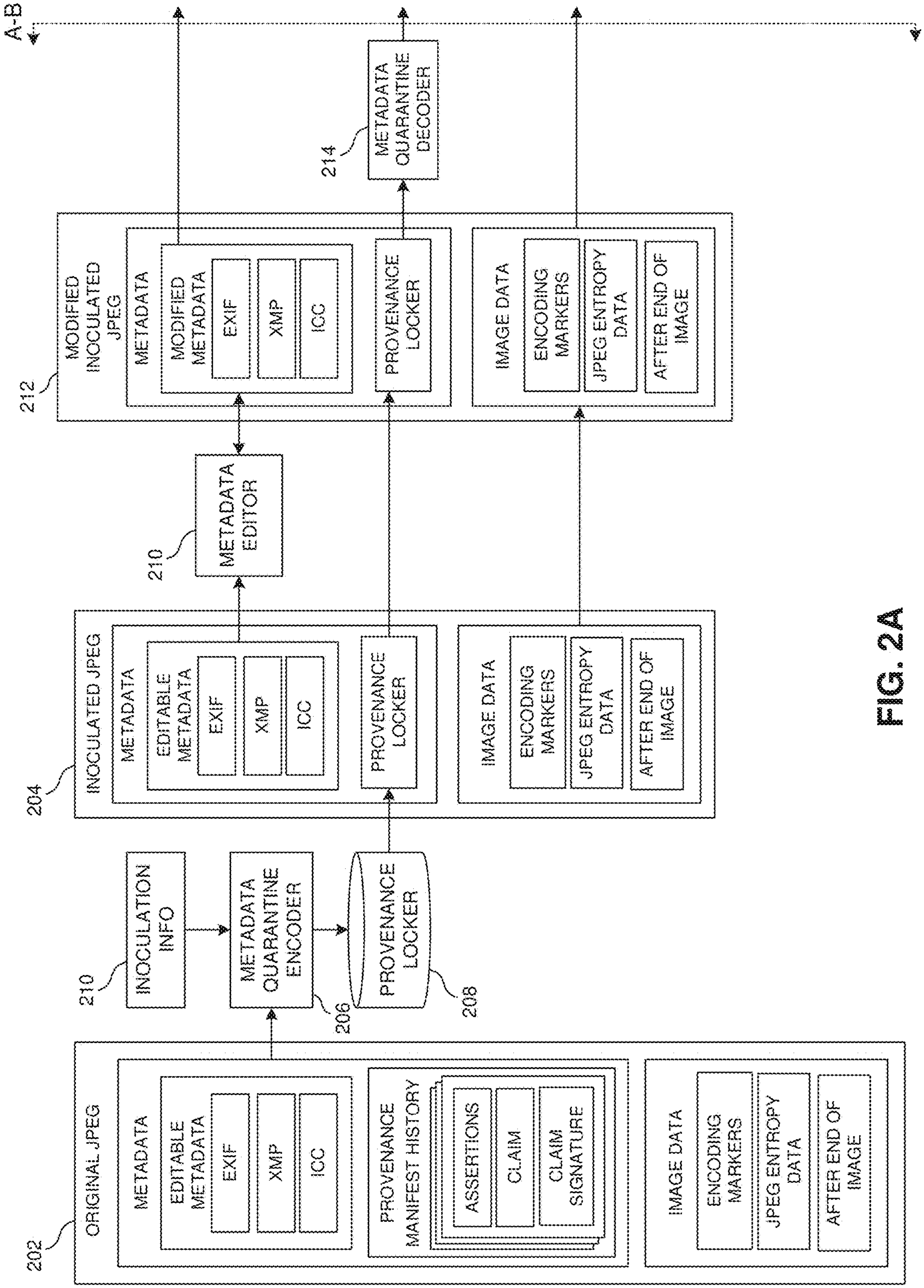
FIGS. 2A and 2B are a block diagram of a process for managing metadata provenance in a signed JPEG file, consistent with an example embodiment.
Figure 2B:
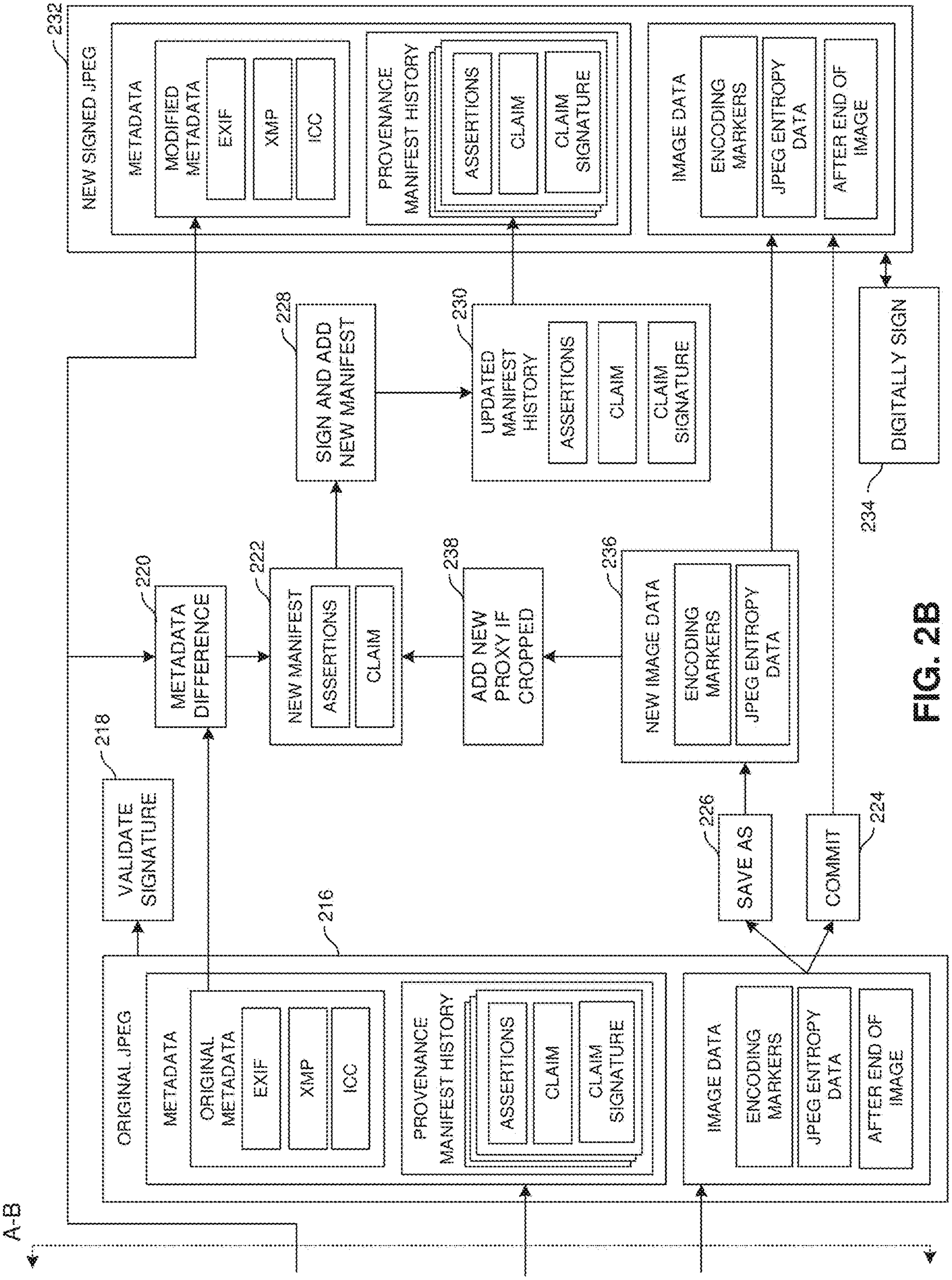

FIGS. 2A and 2B are a block diagram of a process for managing metadata provenance in a JPEG file that may be digitally signed, consistent with an example embodiment. At 202, a JPEG file may be received, such as from a digital camera that signs captured images stored as JPEG files. The JPEG file in this example comprises metadata, including both editable metadata and an optional provenance manifest history for the JPEG file. The editable metadata may include such things as EXIF (Exchangeable Image File) tags or metadata, XMP (extensible Metadata Platform) metadata, and ICC (International Color Consortium) color profile information. The provenance manifest history may contain assertions about changes or additions made to the photo or it's metadata, along with claims and claim signatures attesting to the identity of the entity that made the changes. Finally, image data may include image data representing the photograph or image in the JPEG file, and in the example shown includes encoding markers, JPEG entropy data, and after end-of-image data.

To generate an inoculated JPEG file 204 having the original JPEG file 202's metadata stored in provenance storage, metadata from the original digitally signed JPEG file 202 may be encoded at 206 and stored in a provenance locker 208 along with inoculation info 210 such as the inoculation version, signature source and version, validation status, and other such information. The provenance locker data 208 is stored as part of the inoculated JPEG 204's metadata, and the editable metadata can then be edited freely and repeatedly by metadata editor 210, creating modified inoculated JPEG 212. Because a copy of the original editable metadata and provenance manifest history is stored in the provenance locker, the editable metadata can be changed repeatedly without re-signing the JPEG file with a new digital signature. It should be noted that any suitable data or content, such as provenance locker data, as one example, may be stored in any suitable manner and/or data storage, which may include one or more in-memory locations, databases, distributed ledgers (e.g., blockchains, etc.), or the like, such as to facilitate and/or support one or more operations and/or processes discussed herein.

Once metadata edits via metadata editor 210 are complete, modified inoculated JPEG 212 may have one or more pieces of modified metadata that differ from the editable metadata found in inoculated JPEG 204. A quarantine decoder 214 may decode and/or read the original metadata from the modified inoculated JPEG's provenance locker, enabling recreation of the original signed JPEG as shown at 216 of FIG. 2B. If the original JPEG was digitally signed, its original digital signature may be validated at 218 to ensure the original signed JPEG has been recreated accurately. Metadata differences between the original JPEG 216 and the modified inoculated JPEG 212 of FIG. 2A may be determined at 220. The metadata difference may be used, at least in part, to generate a new manifest, comprising assertions representing the metadata differences at 222. In a further example, the new manifest assertions are assembled into a claim that may be digitally signed.

A determination may be made as to whether to create a new digitally signed version of the JPEG with edited metadata by committing the metadata changes as reflected at 224, or by using a "save as" function in which a new file is saved as reflected at 226. If the "commit" option is chosen as represented at 224, the image data may be saved as-is and the new manifest created at 222 may be digitally signed and added at 228. The resulting updated manifest history as shown at 230 may be added to the new signed JPEG 232, along with the modified metadata from the modified inoculated JPEG 212 of FIG. 2A. If the new signed JPEG 232 is created using a "save as" function, new image data including new encoding markers and JPEG entropy data is created at 236 and may be saved as part of the new signed JPEG image at 232, along with the updated manifest history 230 and modified metadata from the modified inoculated JPEG 212. The "save as" version of the updated manifest history may also include manifest assertions such as a new proxy for the image at 238 if the image is cropped, along with information describing the crop rectangle that was used.

Once the new JPEG is assembled at 232, it may be digitally signed as shown at 234. In one example, this comprises using a user or device's private key in a public key cryptographic digital signature scheme or algorithm to sign the new JPEG. In a more detailed example, a hash of the digital file is generated, and a digital signature is applied to the hash using the signer's private key, such that the user's public key can be used, in whole or in part, to decrypt or verify the hash value associated with the new signed JPEG. Digital signature algorithms that may be suitable for use include RSA, DSA, ECDSA, and other such digital signature algorithms and methods.

Figure 3:
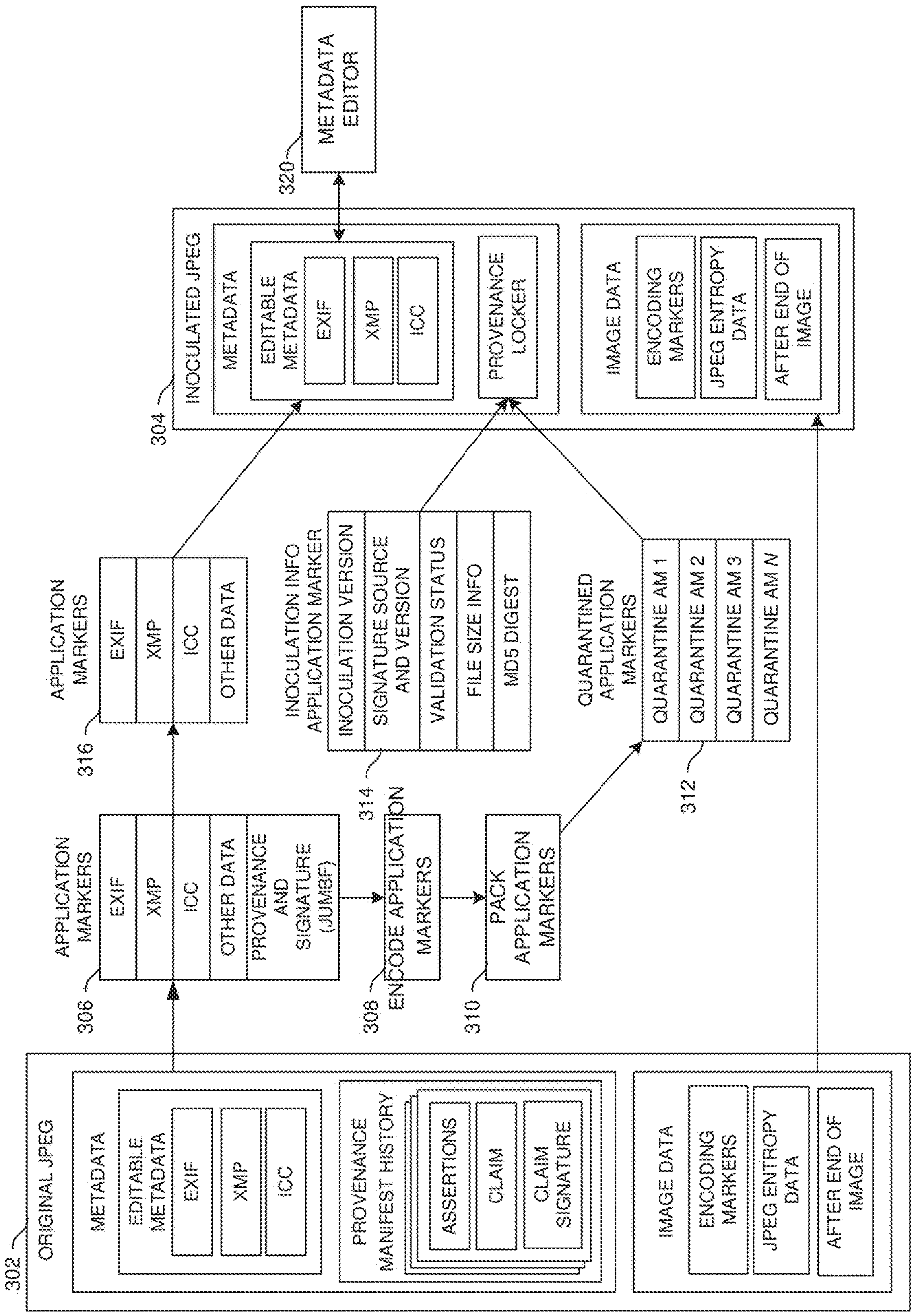
FIG. 3 is a block diagram of a process of managing metadata information in an inoculated JPEG, consistent with an example embodiment.

FIG. 3 is a block diagram of a process of managing metadata information in an inoculated JPEG, used for purposes of illustration in a non-limiting manner, consistent with an example embodiment. As seen, here, an original JPEG that is optionally digitally signed may be received or otherwise accessed (e.g., if stored in a suitable in-memory location, etc.), as shown at 302, such as from or by a digital camera, a photo processing or editing application, or another such source. The original JPEG may comprise metadata and image data, including editable metadata, such as EXIF, XMP and ICC metadata, for example, and an optional provenance manifest history data. To create an inoculated JPEG file 304 from the JPEG file 302, application markers including editable metadata, provenance and provenance signatures, and other suitable data may be extracted, as shown generally at 306. The extracted application markers may be encoded at 308 using any suitable approaches, such as ZIP (Lempel-Ziv), CBOR, or other such compression methods to reduce the amount of storage utilized by the application markers, and further obfuscated using approaches, such as by XOR masking that employs a pseudo random number (RNG) stream to sequentially mask the application marker data, the goal being to preserve the provenance data and discourage any modifications. In some instances, password encryption can be used for the compression, and as a seed for the random number generator used to create pseudo random XOR masking values. A password and seed can be entered directly by the user or automatically generated for a particular photo using the unique or otherwise suitable parts of a JPEG photo's compressed entropy data stream. The encoded application markers may be packed again as JPEG application markers at 310 for storage (e.g., in quarantine, etc.), as shown at 312, such as for incorporation into a provenance locker or provenance storage of inoculated JPEG 304.

The provenance locker of inoculated JPEG 304 may also include one or more inoculation information application markers 314 that contain information such as the inoculation version, signature source and version, validation status, file size info, and MD5 or other hash digest of the original JPEG 302. Editable metadata 316 that is incorporated into editable metadata of inoculated JPEG 304 may then be edited using metadata editor 320, such as Camera Bits, Inc's Photo Mechanic metadata editing tool.

Figure 4:
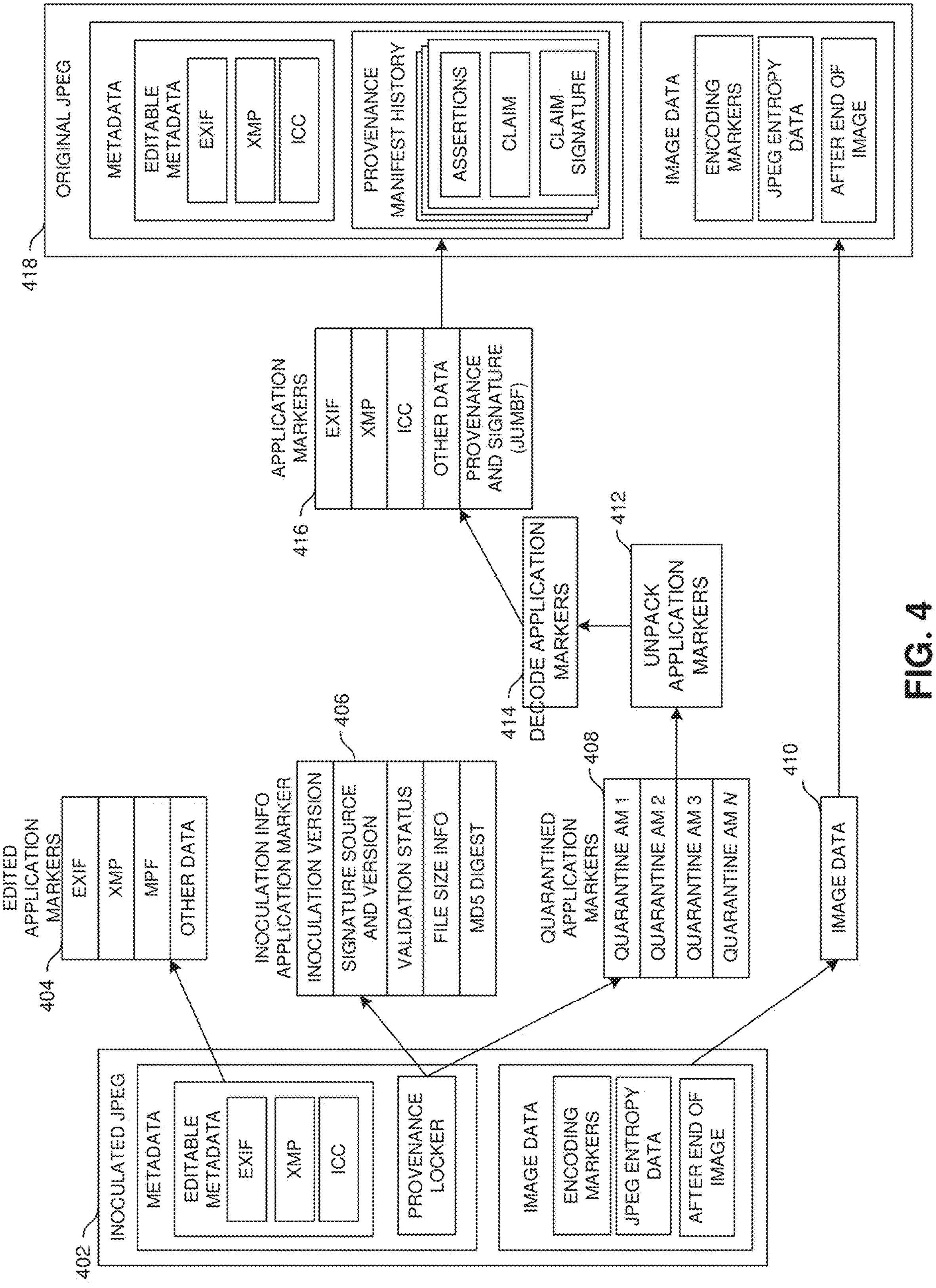
FIG. 4 is a block diagram of a process of managing metadata information in recovering an original JPEG from an inoculated JPEG, consistent with an example embodiment.

FIG. 4 is a block diagram of a process of managing metadata information in recovering an original JPEG from an inoculated JPEG, consistent with an example embodiment. An inoculated JPEG with editable and/or edited metadata is shown at 402, including both editable metadata, provenance locker or provenance storage metadata, and image data such as encoding markers, JPEG entropy data, and after end-of-image data. Edited application markers 404 comprise editable metadata from the inoculated JPEG 402 that may have been edited or modified since inoculation, and inoculation info application marker 406 represents inoculation information such as may have been encoded in the inoculated JPEG's provenance locker at 314 of FIG. 3. Quarantined application markers 408 may comprise editable metadata and a provenance manifest history from the original digitally signed JPEG before inoculation, such as original JPEG 302 of FIG. 3. JPEG image data may similarly be extracted at 410.

The quarantined application markers 408 may then be unpacked at 412 and decoded at 414, recovering the application markers 416 containing the metadata from the original JPEG as shown at 306 of FIG. 3. These application markers containing the original metadata may be used, in whole or in part, along with JPEG image data 410 to reconstruct the original JPEG 418, allowing a user to both recover the original JPEG from the inoculated and edited JPEG file and to manually observe and verify the content of the original JPEG, such as to prove provenance for evidence records, journalism, or the like.

Figure 5:
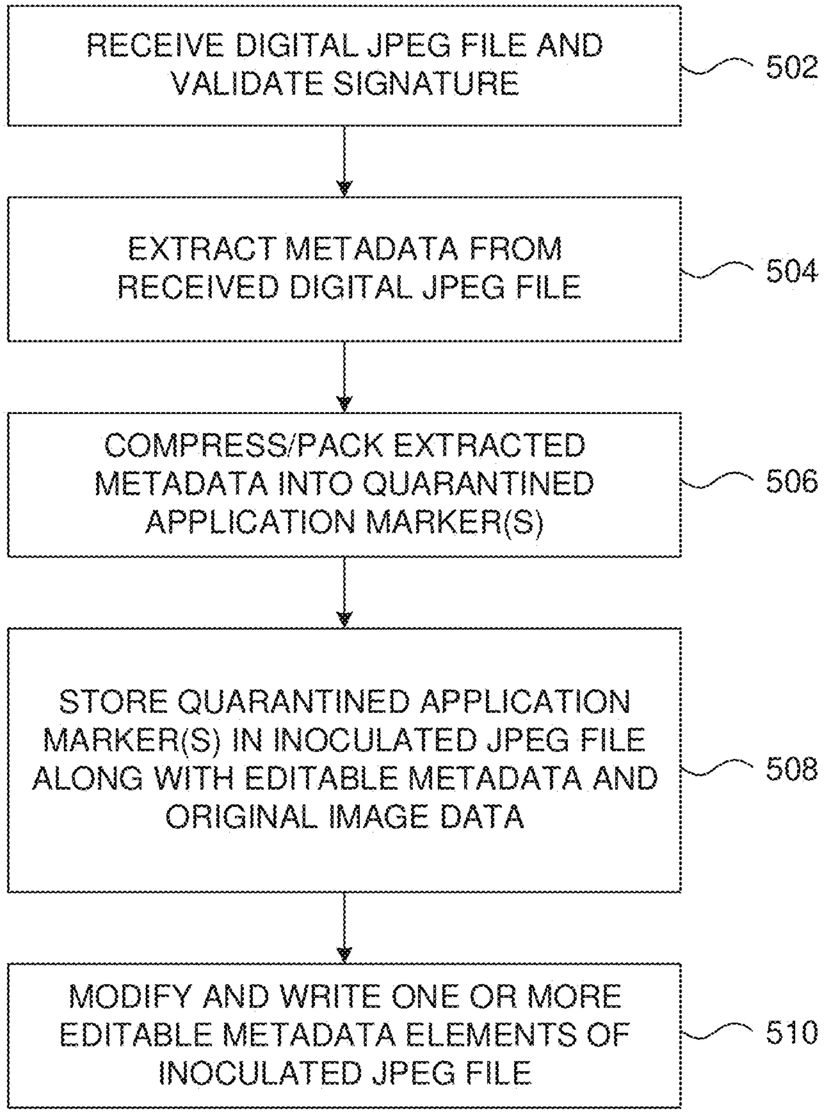
FIG. 5 is a flow diagram of a process for storing metadata for a digitally signed digital media file in a provenance storage, consistent with an example embodiment.

FIG. 5 is a flow diagram of a process for storing metadata for a digitally signed digital media file in a provenance storage, consistent with an example embodiment. A digital JPEG image file that is optionally digitally signed is received at 502, and if signed the digital signature is validated. Editable metadata, such as author, copyright, description, time, date, location, title, subject, and rating, and/or the like, in the digital JPEG image file is extracted at 504. Optionally or additionally, if the JPEG image file is signed then the provenance manifest history metadata is extracted. The extracted metadata is compressed and packetized into a quarantined application marker or markers at 506. The quarantined application marker or markers are stored in the JPEG file to create an inoculated JPEG file at 508, such that the inoculated JPEG file has copies of the original editable metadata and provenance manifest history metadata for a signed digital JPEG image file saved in a providence storage such as the quarantined application marker or markers, other metadata, or the like.

The resulting inoculated JPEG image file can then be edited using a metadata editor one or more times at 510, such as without tracking one or more changes or edits to the editable metadata, as a copy of the original metadata has been saved. If an application or user is ready to commit to the one or more editable metadata changes made to the inoculated image file, the inoculated metadata file's editable metadata can be compared to the quarantined original editable metadata to generate a signed providence change record, and/or to validate the editable metadata changes before signing the resulting edited JPEG image file.

Figure 6:
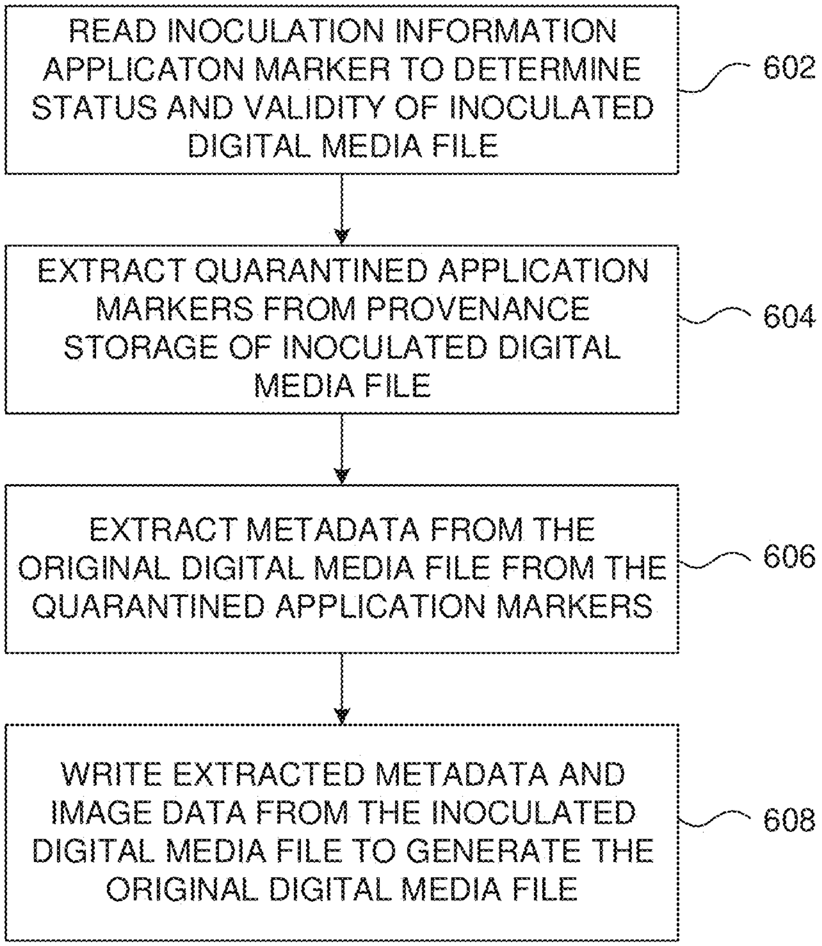
FIG. 6 is a flow diagram of a process for extracting an original digitally signed digital media file from an inoculated digital media file, consistent with an example embodiment.

FIG. 6 is a flow diagram of a process for extracting an original digital media file from an inoculated digital media file, consistent with an example embodiment. An inoculated digital media file having one or more editable metadata records encoded within provenance storage such as a quarantined application marker may be read at 602, and the status and validity of the inoculated file may be verified such as by verifying one or more digital signatures. One or more quarantined application markers may be extracted from provenance storage in the inoculated digital media file at 604, and metadata from the original digital media file may be extracted from the quarantined application markers (or other such provenance storage) at 606.

The editable metadata represents metadata stored from the original digital media file before one or more edits to the original digital media file's editable metadata, and so may be used, at least in part, with other extracted metadata such as provenance history to restore the original digital media file's original metadata at 608. In a further example, one or more metadata records not in the original digital media file such as provenance storage or quarantined application markers are also removed to recreate the original digital media file. The resulting original digital media file may then be validated such as by comparing a digital signature of the recreated file against the digital signature of the original digital media file, ensuring that the original digital media file extraction process was successful.

Examples such as these illustrate how the provenance or history of an optionally signed digital media file may be preserved in a way that allows several rounds of edits to metadata of the digital media file without having to re-sign or re-validate the digital media file after each or suitable edit. By storing the original editable metadata in provenance storage, such as quarantine application markers in a JPEG file, several such rounds of edits may be made without losing track of the original metadata or the extent of metadata changes.

Once a user, program, process, or the like is ready to commit to a digitally signed revised version of the original digital media file, a record of editable metadata changes made can be derived from comparing the current editable metadata to the original editable metadata stored in the provenance storage. The editable metadata changes may therefore be combined into a provenance record of metadata changes (e.g., a single record, etc.) and signed directly, or written into a new digital media file and signed, such that provenance of the digital media file can be followed back to the original digital media file. The original digital media file may also be recovered from such a digital media file with editable metadata stored in provenance storage by extracting the metadata from the original digital media file from provenance storage and writing it to the recreated digital media file.

Figure 7:
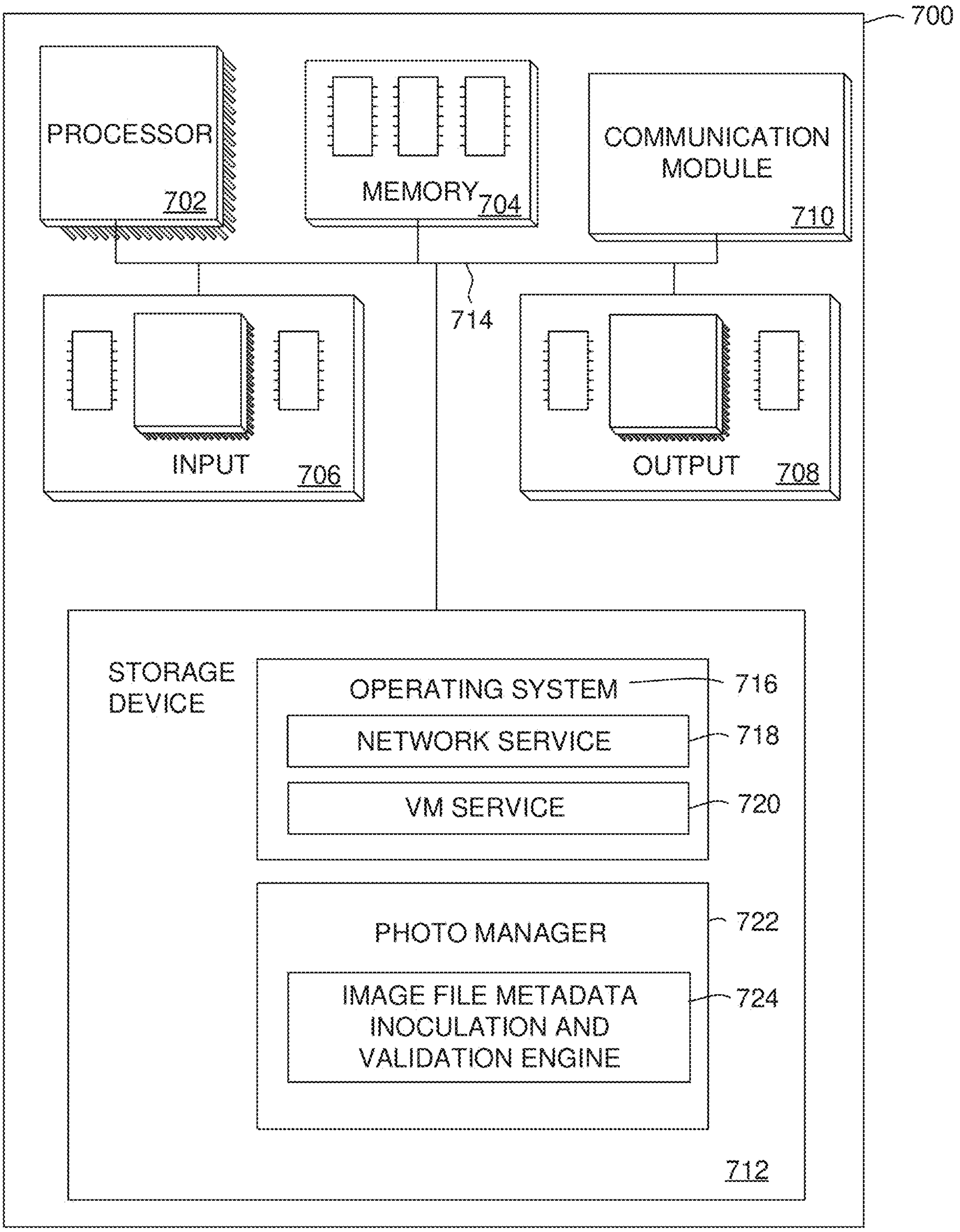
FIG. 7 is an implementation of an example operating or computing environment.

FIG. 7 shows a block diagram of a general-purpose computerized system, consistent with an example embodiment. FIG. 7 illustrates a particular example of computing device 700, and other computing devices 700 may be used, in whole or in part, in other embodiments. Although computing device 700 is shown as a standalone computing device, computing device 700 may be any component or system that includes one or more processors or another suitable computing environment for executing software instructions in other examples, and need not include all of the elements shown here.

As shown in the specific example of FIG. 7, computing device 700 includes one or more processors 702, memory 704, one or more input devices 706, one or more output devices 708, one or more communication modules 710, and one or more storage devices 712. Computing device 700, in one example, further includes an operating system 716 executable by computing device 700. The operating system includes in various examples services such as a network service 718 and a virtual machine service 720 such as a virtual server. One or more applications, such as photo manager 722 are also stored on storage device 712, and are executable by computing device 700.

Components 702, 704, 706, 708, 710, and 712 may be interconnected (physically, communicatively, and/or operatively) for inter-component communications, such as via one or more communications channels 714. In some examples, communication channels 714 include a system bus, network connection, inter-processor communication network, or any other channel for communicating data. Applications such as photo manager 722 and operating system 716 may also communicate information with one another as well as with other components in computing device 700.

Processors 702, in one example, are configured to implement functionality and/or process instructions for execution within computing device 700. For example, processors 702 may be capable of processing instructions stored in storage device 712 or memory 704. Examples of processors 702 include any one or more of a microprocessor, a controller, a central processing unit (CPU), a graphics processing unit (GPU), a neural processing unit (NPU), an image signal processor (ISP), a digital signal processor (DSP), an application specific integrated circuit (ASIC), a field-programmable gate array (FPGA), or similar discrete or integrated logic circuitry.

One or more storage devices 712 may be configured to store information within computing device 700 during operation. Storage device 712, in some examples, is known as a computer-readable storage medium. In some examples, storage device 712 comprises temporary memory, meaning that a primary purpose of storage device 712 is not long-term storage. Storage device 712 in some examples is a volatile memory, meaning that storage device 712 does not maintain stored contents if computing device 700 is turned off. In other examples, data is loaded from storage device 712 into memory 704 during operation. Examples of volatile memories include random access memories (RAM), dynamic random access memories (DRAM), static random access memories (SRAM), and other forms of volatile memories known in the art. In some examples, storage device 712 is used to store program instructions for execution by processors 702. Storage device 712 and memory 704, in various examples, are used, in whole or in part, by software or applications running on computing device 700 such as photo manager 722 to temporarily store information during program execution.

Storage device 712, in some examples, includes one or more computer-readable storage media that may be configured to store larger amounts of information than volatile memory. Storage device 712 may further be configured for long-term storage of information. In some examples, storage devices 712 include non-volatile storage elements. Examples of such non-volatile storage elements include magnetic hard discs, optical discs, floppy discs, flash memories, or forms of electrically programmable memories (EPROM) or electrically erasable and programmable (EEPROM) memories.

Computing device 700, in some examples, also includes one or more communication modules 710. Computing device 700 in one example uses communication module 710 to communicate with external devices via one or more networks, such as one or more wireless networks. Communication module 710 may be a network interface card, such as an Ethernet card, an optical transceiver, a radio frequency transceiver, or any other type of device that can send and/or receive information. Other examples of such network interfaces include Bluetooth, 4G, LTE, or 5G, WiFi radios, and Near-Field Communications (NFC), and Universal Serial Bus (USB). In some examples, computing device 700 uses communication module 710 to wirelessly communicate with an external device such as via a public network such as the Internet.

Computing device 700 also includes in one example one or more input devices 706. Input device 706, in some examples, is configured to receive input from a user through tactile, audio, or video input. Examples of input device 706 include a touchscreen display, a mouse, a keyboard, a voice responsive system, video camera, microphone or any other type of device for detecting input from a user.

One or more output devices 708 may also be included in computing device 700. Output device 708, in some examples, is configured to provide output to a user using tactile, audio, or video stimuli. Output device 708, in one example, includes a display, a sound card, a video graphics adapter card, or any other type of device for converting a signal into an appropriate form understandable to humans or machines. Additional examples of output device 708 include a speaker, a light-emitting diode (LED) display, a liquid crystal display (LCD or OLED), or any other type of device that can generate output to a user.

Computing device 700 may include operating system 716. Operating system 716, in some examples, controls the operation of components of computing device 700, and provides an interface from various applications such as photo manager 722 to components of computing device 700. For example, operating system 716, in one example, facilitates the communication of various applications such as photo manager 722 with processors 702, communication unit 710, storage device 712, input device 706, and output device 708. Applications such as photo manager 722 may include program instructions and/or data that are executable by computing device 700. As one example, photo manager 722 may implement a signed digital media file metadata inoculation and validation engine 724 to perform metadata processing tasks such as those described above. These and other program instructions or modules may include instructions that cause computing device 700 to perform one or more of the other operations and actions described in the examples presented herein.

Although specific embodiments have been illustrated and described herein, any arrangement that achieve the same purpose, structure, or function may be substituted for the specific embodiments shown. This application is intended to cover any adaptations or variations of the example embodiments described herein. These and other embodiments are within the scope of the following claims and their equivalents, which are not limited by the examples presented in the specification.

What is claimed is:

1. A method of managing metadata in signed or unsigned digital media, the method comprising:
- receiving a digital media file comprising one or more metadata elements;
- determining whether a digital signature associated with the digital media file is present and validating the digital signature if present;
- storing the one or more metadata elements received with the digital media file in a provenance storage comprising a part of the received digital media file;
- receiving at least one new or changed metadata element and storing the at least one new or changed metadata element to the digital media file;
- determining one or more differences between the at least one new or changed metadata element and the one or more metadata elements received with the digital media file;
- storing at least one provenance record comprising one or more parameters indicative of the one or more differences between the at least one new or changed metadata element and the one or more metadata elements received with the digital media file in the provenance storage while preserving the one or more metadata elements received with the digital media file; and
- generating a new signed digital media file comprising the at least one new or changed metadata element, the at least one digitally signed provenance record, and the one or more metadata elements received with the digital media file.

2. The method of managing metadata in signed or unsigned digital media of claim 1, wherein the at least one provenance record comprises at least one digitally signed provenance record.

3. The method of managing metadata in signed or unsigned digital media of claim 1, wherein the one or more metadata elements received with the digital media file comprises at least one of the following: an author; a copyright; a description; a keyword; a time; a date; a location; a title; a subject; a rating; one or more other such metadata fields; or any combination thereof.

4. The method of managing metadata in signed or unsigned digital media of claim 1, and further comprising signing the new signed digital media file with a public key cryptographic signature.

5. The method of managing metadata in signed or unsigned digital media of claim 2, wherein the at least one digitally signed provenance record is signed with a public key cryptographic signature.

6. The method of managing metadata in signed or unsigned digital media of claim 1, wherein the signed or unsigned digital media comprises a JPEG image file.

7. The method of managing metadata in signed or unsigned digital media of claim 1, wherein the provenance storage comprises a metadata record.

8. The method of managing metadata in signed or unsigned digital media of claim 7, wherein the metadata record comprises editable metadata in an Exif (EXchangeable Image File format) and/or XMP (extensible Metadata Platform) record.

9. The method of managing metadata in signed or unsigned digital media of claim 6, wherein an image encoded in the JPEG image file remains unchanged between received digital media file and new signed digital media file.

10. The method of managing metadata in signed or unsigned digital media of claim 1, wherein generating a new signed digital media file comprises committing to the at least one new or changed metadata element stored in the digital media file.

11. The method of managing metadata in signed or unsigned digital media of claim 1, wherein generating a new signed digital media file comprises saving a new signed digital media file using a "save as" operation.

12. The method of managing metadata in signed or unsigned digital media of claim 11, wherein the new signed digital media file comprises a digital image that is a resized, compressed, and/or cropped version of the received digital media file.

13. An apparatus comprising a computing device, the apparatus comprising:
- a memory comprising one or more storage devices; and
- one or more processors coupled to the memory, the one or more processors operable to execute instructions stored in the memory to, for at least one signed or unsigned digital media file:
  - receive a digital media file comprising one or more metadata elements and validate a digital signature associated with the digital media file;
  - store the one or more metadata elements received with the digital media file in a provenance storage comprising a part of the received digital media file;
  - receive at least one new or changed metadata element and store the at least one new or changed metadata element to the digital media file;
  - determine one or more differences between the at least one new or changed metadata element and the one or more metadata elements received with the digital media file;
  - store at least one provenance record comprising one or more parameters indicative of the one or more differences between the at least one new or changed metadata element and the one or more metadata elements received with the digital media file in the provenance storage while preserving the one or more metadata elements received with the digital media file; and
  - generate a new signed digital media file comprising the at least one new or changed metadata element, the at least one digitally signed provenance record, and the one or more metadata elements received with the digital media file.

14. The apparatus of claim 13, wherein the at least one provenance record comprises at least one digitally signed provenance record.

15. The apparatus of claim 13, wherein the provenance storage comprises a metadata record.

16. The apparatus of claim 13, wherein to generate the new signed digital media file comprises to commit to the at least one new or changed metadata element stored in the digital media file.

* * * * *